United States Patent [19]
Takaha

[11] Patent Number: 6,021,221
[45] Date of Patent: Feb. 1, 2000

[54] IMAGE PROCESSING APPARATUS

[75] Inventor: Hiroki Takaha, Yamatokoriyama, Japan

[73] Assignee: Sharp Kabushiki Kaisha, Osaka, Japan

[21] Appl. No.: 08/995,148

[22] Filed: Dec. 19, 1997

[30] Foreign Application Priority Data

Dec. 24, 1996 [JP] Japan ................................ 8-343894

[51] Int. Cl.⁷ .................................................. G06K 9/48
[52] U.S. Cl. ........................ 382/199; 382/164; 382/171; 382/173; 382/175; 382/190; 382/282; 382/291
[58] Field of Search .................................. 382/282, 291, 382/199, 198, 190, 181, 175, 171, 164

[56] References Cited

U.S. PATENT DOCUMENTS

| | | | |
|---|---|---|---|
| 5,031,049 | 7/1991 | Toyama et al. | 358/227 |
| 5,091,967 | 2/1992 | Ohsawa | 382/22 |
| 5,454,050 | 9/1995 | Nakabashi et al. | 382/165 |
| 5,475,507 | 12/1995 | Suzuki et al. | 358/500 |
| 5,742,279 | 4/1998 | Yamamoto et al. | 345/173 |
| 5,881,170 | 3/1999 | Araki et al. | 382/199 |

FOREIGN PATENT DOCUMENTS 1-175076  7/1989  Japan .
5-216992  8/1993  Japan .

*Primary Examiner*—Christopher S. Kelley
*Assistant Examiner*—Kanji Patel
*Attorney, Agent, or Firm*—Nixon & Vanderhye P.C.

[57] ABSTRACT

A method for designating an object image to be extracted is simplified. Positions of contour designation points are designated by employing an operation input apparatus so that a contour region of an initial region containing a desirable subjective object image is designated. A central processing circuit firstly subdivides the basic image into a plurality of division regions which are like in color, in units of pixel groups. Subsequently, the central processing circuit calculates distances between pixels within the division region and pixels within the contour region, and also calculates positions of pixels with respect to the initial region, and then determines factor values for the respective pixels on the basis of distance values indicative of the distance and the position. Subsequently, the central processing circuit accumulates the factor values of every division region to thereby calculate the weight factor of each division region, and judges whether or not each division region is equal to a subject region by comparing a weighting factor with a judgment value. Finally, the central processing circuit extracts pixel data of pixels contained in the subject region from a basic image signal to thereby produce an extract image signal.

10 Claims, 10 Drawing Sheets

FIG. 11

|   |   |   |   |   |   |   |   |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 1 | 1 | 1 | 1 | 1 |
| 0 | 0 | 1 | 1 | 2 | 2 | 2 | 2 |
| 0 | 0 | 1 | 1 | 2 | 3 | 3 | 3 |
| 0 | 0 | 0 | 1 | 2 | 2 | 3 | 4 |
| 0 | 0 | 0 | 1 | 1 | 2 | 3 | 4 |
| 0 | 0 | 0 | 0 | 1 | 2 | 3 | 4 |

| -85 | -85 | -85 | -85 | -85 | -85 | -85 | -85 |
|-----|-----|-----|-----|-----|-----|-----|-----|
| -85 | -85 | -85 | -85 | -85 | -85 | -4  | -4  |
| -85 | -85 | -85 | -85 | 0   | 0   | -4  | -4  |
| -70 | -70 | -70 | -70 | 7   | 7   | -4  | -4  |
| -70 | -70 | -70 | -70 | 7   | 7   | -4  | -4  |
| -70 | -70 | -70 | -70 | 7   | 7   | 4   | 13  |
| -70 | -70 | -70 | -70 | 13  | 13  | 4   | 13  |
| -70 | -70 | -70 | -70 | 13  | 13  | 13  | 13  |

IMAGE PROCESSING APPARATUS

BACKGROUND OF THE INVENTION

1. Field of the Invention

The present invention relates to an image processing apparatus for extracting an image portion from a two-dimensional image.

2. Description of the Related Art

Recently, two-dimensional images produced by imaging objects by using imaging apparatuses such as scanners, digital still cameras, and video cameras are stored into storage media as image signals of binary digital data signals. Then, the two-dimensional images stored in the above-described manner can be electronically processed by employing electronic appliances such as computers.

To electronically process a two-dimensional image in the above manner, for instance, a desired image region within the two-dimensional image is selected so as to be extracted by an operator of an electronic appliance. At this time, for example, this operator manipulates a mouse in such a manner that a contour of the desired image region within the two-dimensional image is traced by way of a mouse cursor movable within this two-dimensional image in conjunction with the mouse. As a result, this desired image region can be designated. In this designating manner, when a desired image region owns a complex contour shape, it is difficult for the operator to trace the contour correctly or accurately. As a consequence, a lengthy operation time would be necessarily required so as to accurately designate the desired image region. Also, very cumbersome process operation would be given to the operator.

As one prior art related to a two-dimensional image processing technique, an image editing apparatus is described in Japanese Unexamined Patent Publication JP-A 1-175076 (1989). In the prior art image editing apparatus, an operator of this image editing apparatus first designates an envelope line which surrounds a desired image region within a color natural image. Next, among coupled regions in which pixels having similar colors are coupled to each other within the region surrounded by the envelope line, a coupled region having an area larger than or equal to a predetermined ratio within the above region is removed from the region within the envelope line. Thus, the remaining region is cut out. In this image editing apparatus, it is desirable that the coupled region will constitute the background of the desired image region. However, in the case that this background is constituted by coupling a number of regions wherein completely different colored pixels are coupled to each other in a small number, the dimensions of the respective different-colored coupled regions are decreased. As a result, since these different-colored coupled regions can be hardly removed from the region within the envelope line, it is practically difficult to cut out only a desired image region.

Also, as another prior art related to a two-dimensional image processing technique, an image clipping apparatus is described in Japanese Unexamined Patent Publication JP-A 5-216992 (1993). In this conventional image clipping apparatus, an image to be processed is divided into a plurality of regions, depending upon the similarity of features of spatial frequencies. Then, an operator of this image clipping apparatus designates a region containing a desired image region from the divided regions. Subsequently, based upon the color distribution within the designated region, the image region is extracted. In this image clipping apparatus, the image is divided on the basis of the spatial frequencies. However, the desired image region is not always involved in a single divided region. Thus, the operator is required to designate a plurality of divided regions, resulting in cumbersome operation. In the case that the feature of the spatial frequency of the desired image region is similar to that of the remaining region within the image to be processed, the divided regions may excessively become larger than the desired image region. In this case, it is difficult to extract the desired image region based upon the color distribution.

SUMMARY OF THE INVENTION

An object of the present invention is to provide an image processing apparatus capable of simply designating an image region to be extracted, and also of firmly extracting the above-described image region from a two-dimensional image.

The invention provides an image processing apparatus comprising:

dividing means for dividing a two-dimensional image indicated by an image signal containing a plurality of pixel data indicative of pixels and composed of a plurality of pixels, into a plurality of division regions each composed of either one or plural pixels whose pixel data are similar to each other;

designating means for designating a contour region composed of pixels of an outermost edge portion of an initial region containing an extract region to be extracted from the two-dimensional image;

position computation means for obtaining a positional relationship between each pixel in the contour region designated by the designating means, and each of remaining pixels other than the pixels of the contour region in the two-dimensional image;

weight computation means for obtaining a weighting factor of each division region on the basis of the positional relationships with respect to respective pixels in the division region, obtained by the position computation means;

judging means for comparing the weighting factor of each division region obtained by the weight computation means with a predetermined judging value to thereby judge when the weighting factor is larger than the predetermined judging value that at least a portion of each respective division region is contained in the extract region, and judge when the weighting factor is smaller than the judging value that the division region is not contained in the extract region; and extracting means for extracting from the image signal, pixel data of pixels of a division region judged by the judging means such that at least a portion thereof is contained in the extract region.

In accordance with the present invention, the image processing apparatus first divides the two-dimensional image to be processed into a plurality of division regions. Next, this image processing apparatus causes an operator to designate the contour region which constitutes the outermost edge portion of the initial region. This contour region macroscopically corresponds to the contour line of the initial region. Subsequently, the image processing apparatus judges whether or not at least a portion of each division region is contained in the extract region, and then extracts the pixel data within the division region judged that at least a portion of this division region is involved. When a judgment of the extract region is carried out, the weighting factor is obtained for each division region on the basis of the positional relationships between the pixels in this division region and the pixels in the contour region. The judging means carries out the judgment on the basis of the magnitudes of the weighting factors.

As a consequence, the operator may designate merely the contour region so that the initial region surrounds a desired region to cause the image processing apparatus to extract the pixel data of the pixels of only the division region including the extract region. Accordingly, since the contour region is no longer made correctly coincident with the contour of the extract region and the operator simply designates a single contour region, the designating operation by the operator can be made simplified. Furthermore, since the weighting factor is obtained on the basis of the positional relationship between the pixels within the contour region and the pixels within the division region, this weighting factor is not influenced by the colors of the respective pixels, different from the conventional image processing apparatuses. As a result, even when the pixels having the substantially same colors as those contained in the extract region are involved into the remaining regions other than the extract region, only the division region containing the extract region can be extracted. As a consequence, the work load of the designation processing operation by the operator required for the image processing operation can be reduced. Also, the processing time required for the designation processing operation can be shortened.

Furthermore the invention is characterized in that the positional computation means includes position judging means for judging whether a position of each pixel is located inside or outside the initial region; and distance calculating means for calculating a distance between each pixel of the contour region and each of the remaining pixels, and that the weighting factor of each division region is an accumulated value of factor values of the respective pixels constituting the division region, the factor values of the respective pixels correspond to the positions judged by the position judging means and the distances calculated by the distance calculating means, the factor values of the pixels within the initial region are larger than the factor values of the pixels outside the initial region, and further the longer the distances become, the larger the factor values within the initial region become.

Also, in accordance with the present invention, the position computation means of the image processing apparatus calculates the distance between each pixel within the contour region and each of the remaining pixels, and judges whether the remaining pixel is located inside or outside the initial region, as indices for the positional relationship between the pixels. The weighting factor is the accumulated value of the factor values of the pixels in each division region, and the factor value of each pixel is determined in the above-explained manner. As a result, for instance, when the dimensions of the respective division regions are equal to each other, the weighting factor of the division region composed of only the pixels outside the initial region is smaller than the weighting factor of the division region constructed only by the pixels inside the initial region. Also, in this case, the weighting factor of the division factor composed of the pixels inside and outside the initial region is smaller than the weighting factor of the division region composed of only the pixels inside the initial region, since the factor value of the pixel outside the initial region is smaller than that of the pixel inside the initial region and the factor value of the pixel inside the initial region near the contour region is smaller. As a consequence, the discrimination can be made whether the division region is constructed only by the pixels outside the initial region, by the pixels inside and outside the initial region, or only by the pixels inside the initial region by merely checking the magnitude of the weighting factors.

Since the above-described initial region is determined in such a manner that the extract region is involved, it can be considered that the division region containing the pixels inside and outside the initial region is a background with respect to the extract region to be extracted. Therefore, only the pixel data of the pixels of the remaining division region except for such a division region is extracted from the initial region, so that the background can be removed from the initial region and the desired extract region can be obtained.

Furthermore the image processing apparatus of the invention is characterized in that the factor values of the pixels outside the initial region are negative values, whereas the factor values of the pixels inside the initial region are positive values.

In accordance with the present invention, since the factor values of the pixels outside the initial region are negative values, the larger the number of the pixels outside, the smaller the weighting factor of the division region containing the pixels outside the initial region becomes. As a result, the weighting factor is not increased, but conversely decreased even when the number of the pixels outside the initial region is increased in the division region composed of the pixels outside the initial region and in the division region composed of the pixels inside and outside the initial region. Thus, the difference is increased between the weighting factor of this division region and the weighting factor of the division region composed of only the pixels inside the initial region. Therefore, the judging means can firmly judge that either the division regions containing the pixels outside the initial region or the pixels inside and outside the initial region are not involved in the extract region.

As described above, in the case where on the basis of the judgment results about the distances between the pixels in the contour region and the remaining pixels, and about whether the remaining pixels are located inside or outside the initial region, the position computation means computes the weighting factor values of the respective pixels and accumulates this factor values to thereby obtain the weighting factors of the division regions, since the factor values of the pixels within the remaining region outside the initial region are set to be negative, the division region containing the pixels inside and outside the initial region can be surely removed from the initial region. As a consequence, the extracted division region can be substantially coincident with the desired extract region, so that the extract precision of the desired extract region can be enhanced.

Furthermore the invention is characterized in that the image processing apparatus further comprises factor changing means for changing the factor values.

In accordance with the present invention, the factor values of the weighting factors can be changed. Accordingly, for example, the operator can set the factor values suitable to the two-dimensional image to be processed. As a consequence, when the similarity degree between the contour region and the contour of the extract region of the two-dimensional image is different from that of another two-dimensional image, the factor values can be set in response to the similarity degree with respect to the two-dimensional image to be processed. Additionally, when a natural image and an image having different natures, e.g., a black and white line image are selected as a two-dimensional image to be processed, the factor values can be set in response to the natures of the respective images.

Furthermore the invention is characterized in that the judging means selects either of a predetermined reference judging value corresponding to an initial region having an area smaller than a predetermined reference area or an initial judging value corresponding to an initial region having an area equal to or larger than the predetermined reference area, on the basis of the area of the initial region inside the contour region designated by the designating means to use as the judging value, and that the initial judging value is varied in response to the area of the initial region.

In accordance with the present invention, the judging means compares either of the initial judging value or the reference judging value functioning as the judging value with the weighting factor, and judges that the division region having the weighting factor equal to or larger than the above value is contained in the extract region. As described above, since the judging value is selected in accordance with the dimension of the initial region, the judging operation for the weighting factor adapted to the dimension of the initial region can be performed. Additionally, when the dimension of the initial region is extremely different from the reference area whose reference judging value is effective, the initial judging value is employed, so that the judging operation for the weighting factor can be executed under stable condition.

Furthermore, the invention is characterized in that the pixel data of each pixel include numeral values related to each of a plurality of display characteristics of the pixel;
that the image processing apparatus further comprises characteristic selecting means for selecting one of the plurality of display characteristics and difference value setting means for setting a reference difference value to be compared with a difference value of the numeral values between each pixel and the pixels therearound in the two-dimensional image; and
that the dividing means calculates a difference value between the numeral value of each pixel and the numeral value of each of a predetermined number of pixels therearound in the two-dimensional image and divides the two-dimensional image so that pixels having a difference value smaller than the reference difference value are contained in a same region.

In accordance with the present invention, the pixel data contains numeral values indicative of a plurality of display characteristics, for example, luminance data signals which show luminances of a plurality of chromatic lights which are used in different combinations. The dividing means determines the division region on the basis of the numeral value of one of these display characteristics in the above-explained manner. The sorts of display characteristics and the reference difference value can be changed by the operator of the image processing apparatus. As a consequence, when the two-dimensional image to be processed includes various images of different natures, for instance, a natural image and a black and white line image, the operator can set the sorts of display characteristics and the reference difference value suitable to the nature of the two-dimensional image. Additionally, the sorts of display characteristics and the reference difference value can be set so as to serve the purpose of the operator.

As described above, in the image processing apparatus, the factor values of the weighting factors can be arbitrarily changed. The judging value of the weighting factor by the judging means can be changed in connection with the area of the initial region. Furthermore, the sorts of the display characteristics of the pixel data and the reference difference value in the dividing means can be arbitrarily changed. As a consequence, the image processing operation can be carried out according to the setting precision of the contour region, the nature of the two-dimensional image to be processed, and the purpose of the image processing of the operator.

Furthermore the invention is characterized in that the image processing apparatus further comprises:
display means for displaying an extract image composed of only pixels indicated by the pixel data extracted by the extracting means; and
re-executing means for causing at least one of the contour region, any one of the plural sorts of display characteristics and the reference difference value by the designating means, the characteristic selecting means and the difference value setting means to designate again, causing the dividing means to divide the two-dimensional image, causing the position computation means to compute the positional relationship, causing the weight computation means to compute the weighting factor to be judged by the judging means, and causing the extracting means to extract the pixel data.

In accordance with the present invention, when a series of image processing operations is accomplished by the respective means from the dividing means to the extracting means, the above-explained extracted image is displayed on the display means. As a consequence, the operator visually observes the extracted image, and can judge whether or not this extracted image is coincident with the extract region. Furthermore, the operator can judge whether or not the extract precision, which indicates the coincident degree between the extracted division region and the extract region, is high.

When the extracted image is not coincident with the extract region, a series of the above-described image processing operations can be again executed by re-executing means. At this time, at least one from the contour region, the sort of pixel value, and the reference difference value can be changed. As a consequence, while the operator can confirm the extract precision judged from the executed extract image during the re-executing operation, the respective parameter values adapted to the two-dimensional image can be again set so as to enhance the extract precision. As a result, every time the image processing operation is repeatedly performed, the respective parameter values can be fitted to the two-dimensional image to be processed.

Furthermore the invention is characterized in that the image processing apparatus further comprises:
region unifying means for unifying a plurality of division regions into a single division region when the judging means judges that a plurality of division regions are contained in the extract region, and causing the extracting means to extract pixel data of pixels in this single division region.

In accordance with the present invention, when a plurality of division regions are selected by the judging means, the region unifying means unifies these regions into a single division region. As a consequence, since the extract region constructed by the plural division regions before being unified is contained in the single division region after being unified, the subsequent image processing operation can process only the single division region. As a result, the image can be easily handled in an image processing operation that, for example, the operator designates a desired division region.

Also, the invention is characterized in that the image processing apparatus further comprises:
storage means for storing a plurality of image signals of two-dimensional images; and
image selecting means for selecting a single image signal to be divided by the dividing means, from the plural image signals stored in the storage means and for supplying the selected single image signal to the dividing means.

In accordance with the image processing apparatus of the present invention, a desired image signal is selected from a plurality of image signals stored in the storage means, and then a series of the above-described processing operations can be performed with respect to the two-dimensional image indicated by this selected image signal. As a consequence, when the image processing operation is executed for a plurality of two-dimensional images, the image signals previously stored in the storage means can be handled without sequentially supplying the image signals of each of the two-dimensional images to this image processing apparatus. In particular, when the image processing operation is carried out with respect to a large number of image signals, the operator can smoothly perform the image processing operation.

BRIEF DESCRIPTION OF THE DRAWINGS

Other and further objects, features, and advantages of the invention will be more explicit from the following detailed description taken with reference to the drawings wherein:

FIG. 11 is an enlarged diagrammatic view showing a portion 70 in a distance image of the basic image 22, which corresponds to the portion 60 in FIG. 7;

DETAILED DESCRIPTION OF THE PREFERRED EMBODIMENTS

Figure 1:
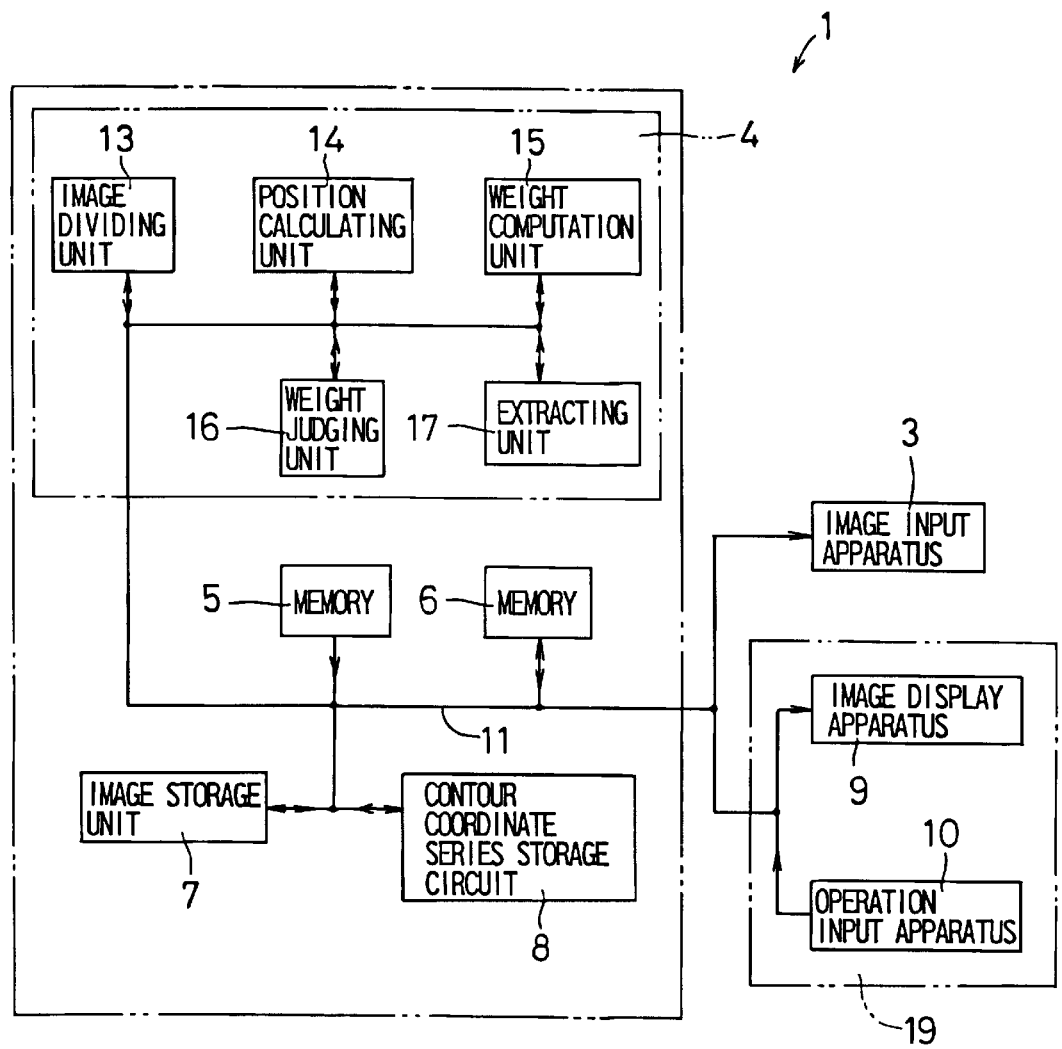
FIG. 1 is a block diagram showing an electronic arrangement of an image processing apparatus 1 according to one embodiment of the present invention.

Now referring to the drawings, preferred embodiments of the invention are described below.

FIG. 1 is a block diagram showing an electronic arrangement of an image processing apparatus 1 according to an embodiment of the present invention. The image processing apparatus 1 is an apparatus capable of extracting a portion of an image indicated by an image signal, and of acquiring an image of only the extracted image portion. The image processing apparatus 1 comprises an image input apparatus 3, a central processing circuit 4, memories 5 and 6, an image storage circuit 7, a contour coordinate series storage circuit 8, an image display apparatus 9, and an operation input apparatus 10.

The image input apparatus 3 conducts a basic image signal to be handled in the image processing apparatus 1 from outside thereof. This basic image signal indicates a basic image constituted by arranging a plurality of pixels in a matrix form, corresponding to a two-dimensional image. This basic image signal is a digital signal containing pixel data indicative of the respective pixels. Each of the pixel data contains positional data indicative of positional coordinate values of the pixels within the basic image and luminance data representative of luminance of the pixels. The luminance data correspond to a numeral data signal indicative of a display characteristic of a pixel. In the case where the basic image is a color image, the numeral data signal contains luminance data with respect to each monochromatic light, for instance, red, blue, and green. As the data indicative of the display characteristic of the pixel, data other than the luminance may be contained.

The image input apparatus 3 is an apparatus for reading out a signal from a recording medium, concretely speaking, a hard disk, a floppy disk, and a video tape and the like. At this time, for instance, a basic image signal produced by imaging an object by way of an imaging apparatus has been stored in these recording media. The image input apparatus 3 reads out the basic image signal stored in this storage medium, and supplies the read basic image signal to the image processing apparatus 1. As the imaging apparatus, for example, a scanner, a digital still camera, and a video camera are involved. Alternatively, the image input apparatus 3 itself may contain this imaging apparatus, and may directly enter thereinto the produced basic image signal without via the recording medium. Furthermore, the basic image signal may be produced by employing an apparatus other than the above-explained imaging apparatus, and employing another method. Also, for instance, the above-explained image signal may be an image signal of an image distributed by using a recording medium such as a CD-ROM, which is formed by a third party other than the operator of the image processing apparatus 1. These operations for acquiring the basic image signal may be previously prepared before executing an image processing operation (this will be explained later) by the image processing apparatus 1, or may be executed immediately before the image processing operation.

The central processing circuit 4 executes various sorts of programs, and controls a data interface. This central processing circuit 4 contains, for instance, an image dividing unit 13, a position computation unit 14, a weight computation unit 15, a weight judging unit 16, and an extracting unit 17 (this will be discussed later). It should be noted that each of the above-described units 13 to 17 corresponds to a virtual circuit realized by executing computing process operations in the central processing circuit 4. Alternatively, the respective units 13 to 17 may be realized by using practically available discrete circuit components.

The memory 5 stores therein various control sequences used to perform image processing operations (this will be discussed later), which include various sorts of programs executed in the central processing circuit 4. The memory 6 contains a work memory area and an operation memory area. The work memory area temporarily stores therein data under process operations by the central processing circuit 4. The operation memory area stores therein an input result derived from the operation input apparatus 10 (this will be explained later). The memory 5 may be realized by employing, for instance, a read-only memory (ROM). The memory 6 may be realized by, for example, a random access memory.

Into the image storage circuit 7, the basic image signal inputted from the image input apparatus 3, and various sorts of image signals are stored. These image signals are produced while the image processing operations are carried out (this will be explained later). As will be discussed later, as the image signals for the image process operation, there are, for instance, a region label image signal, a distance image signal, and a mask image signal. Also, one or plural basic image signals are stored. The contour coordinate series storage circuit 8 stores an initial contour coordinate series signal indicative of a contour region 25 (this will be explained later), and an extracted contour coordinate series signal indicative of an extracted contour line (this will be discussed later).

The image display apparatus 9 has an image display region and an information display region. A basic image and an extracted image are visually displayed in the image display region. The extracted image is a two-dimensional image indicated by an extracted image signal which is obtained by the below-mentioned image processing operation. In the information display region, various sorts of parameters are visually displayed which may be set by an operator during the image processing operation (this will be described later). The image display apparatus 9 may be realized by, for example, a cathode-ray tube and a liquid crystal display device.

The operation input apparatus 10 is manipulated by the operator when the contour region 25 and the various sorts of parameters are entered during the below-mentioned image process operation. This operation input apparatus 10 is realized by such a coordinate input apparatus as a keyboard, a mouse, and a touch panel, and further contains a mouse in the image processing apparatus 1 according to this embodiment.

The image display apparatus 9 and the operation input apparatus 10 constitute a user interface unit 19. The image display apparatus 9 visually displays the parameters presently set to the image processing apparatus 1, and information containing the basic image to be processed. While the operator visually observes the displayed information, the operator determines the input information with respect to the image processing apparatus 1. The display image related to the information inputted by the operator by using the operation input apparatus 10 is reflected in addition to the display image of the image display apparatus 9.

The above-described constructive components 3 to 10 of the image processing apparatus 1 are electrically connected via a bus line 11 to each other. The respective operations of these constructive components 4 to 10 are controlled via the bus line 11 by the central processing circuit 4. The storage contents of the memories 5 and 6, the image storage circuit 7, and the contour coordinate series storage circuit 8 are supplied via the bus line 11 to the central processing circuit 4 so as to be used in the below-mentioned image processing operations. After the various sorts of image signals and the parameters visually displayed on the image display apparatus 9 are read out from the memories 5 and 6 and the storage circuits 7 and 8 by the central processing circuit 4, these read parameters and image signals are supplied to the image display apparatus 9 via the bus line 11. The output signal derived from the operation input apparatus 10 is supplied via the bus line 11 to the central processing circuit 4, and is stored in the operation data area of the memory 6, or the contour coordinate series storage circuit 8. The explanation about the bus line 11 may be omitted.

Figure 2:
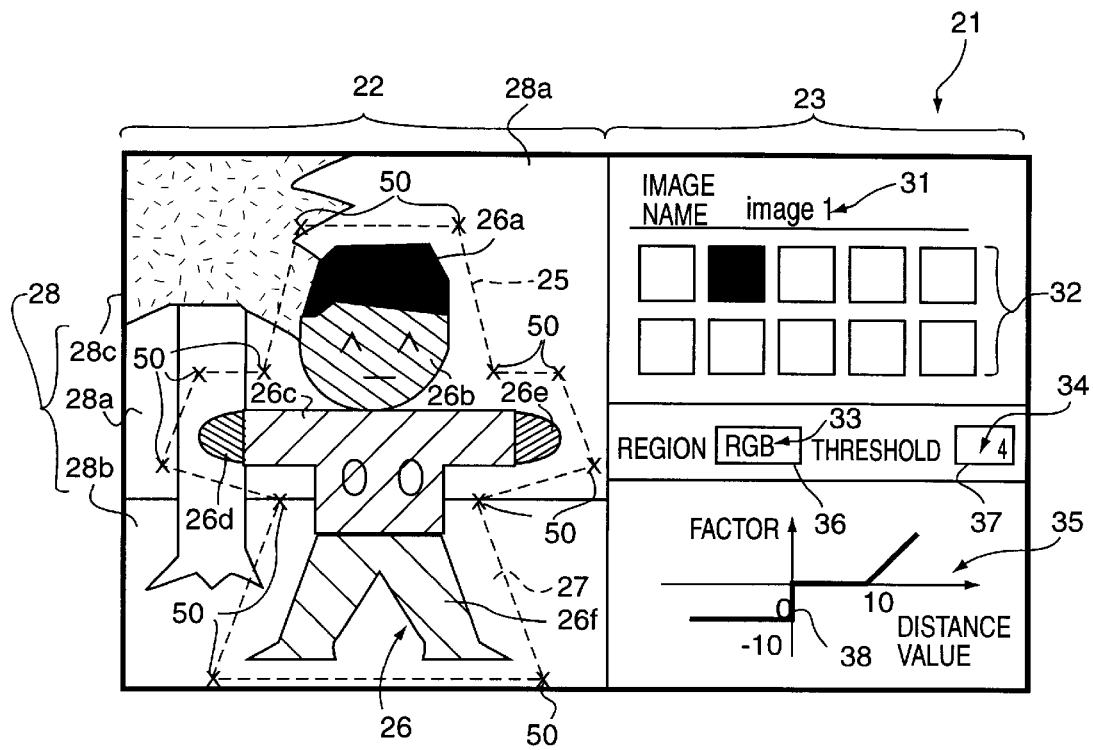
FIG. 2 is a view showing a display image 21 displayed on an image display apparatus 9 in an initial stage of an image processing operation by the image processing apparatus 1.

FIG. 2 is a view showing a display image 21 displayed on the image display apparatus 9 at an initial stage of an image processing operation executed by the image processing apparatus 1. The display image 21 contains a basic image 22 to be processed, and an information image 23 used to represent information for operation entry to the operator. The basic image 22 is displayed in the above-described image display region, and the information image 23 is displayed in the information display region.

The basic image 22 is a two-dimensional image indicated by a single basic image signal, and contains a plurality of object images showing a plurality of object. The display image 21 shown in FIG. 2 includes object images such as a human, a tree, the ground, and the sky, respectively. A contour region 25 is macroscopically displayed by being overlapped with this basic image 22. The contour region 25 is a region constructed by pixels of an outermost edge portion of an initial region 27 containing a subjective object image 26 equal to an image within an extract region to be extracted from the basic image 22. This contour region 25 is macroscopically equal to a single curved line. In other words, this contour region 25 is a contour line indicative of an outer edge of the initial region 27. In FIG. 2, the subjective object image 26 is a human image. It should be understood that the object images other than the subjective object image 26 within the basic image 22, namely, the object images of the sky 28a, the ground 28b, and the tree 28c in FIG. 2, will be referred to as a "background image" 28 hereinafter.

The image information 23 includes an image name 31, a reduced image group 32, a region dividing method 33, a threshold value 34, and a distance/factor graph 35. The information used to input the operations is visually displayed by these.

The image name 31 is a name of the basic image 22 presently displayed in the image display region. In FIG. 2, the name of the presently displayed basic image 22 is "image 1". The reduced image group 32 contains all of reduced images in which basic images indicated by a plurality of basic image signals to be stored are reduced. Among these reduced images, the reduced image of the basic image presently displayed in the image display region is displayed in an inverse mode. This inverse display mode implies such a method that when the basic image is, for instance, a monochromatic image, dot display colors (namely, white and black) are inverted into black color and white color, respectively. In FIG. 2, only the outer edges of the reduced images are represented by white rectangular shapes, and the reduced image displayed in the inverse mode is represented by a black rectangular shape.

The region dividing method 33 and the threshold value 34 correspond to data sorts within pixel data and an input value of a reference difference value, which will be processed by a region dividing operation (this will be explained later) of the image processing operation. The operator may change the sort of data, and the reference difference value by rewriting characters displayed in rectangular regions 36 and 37 by using black frames. The distance factor graph 35 indicates factor values with respect to distance values (this will be discussed later). The distance values and the factor values are utilized in a weight computing operation (this will be discussed later) of the image processing operation. The operator may change the relationship between the factor values of the distance values by rewriting a polygonal line 38. The character rewriting operation and the rewriting operation of the polygonal line 38 are carried out by, for instance, manipulating the operation input apparatus 10 by the operator.

Figure 3:
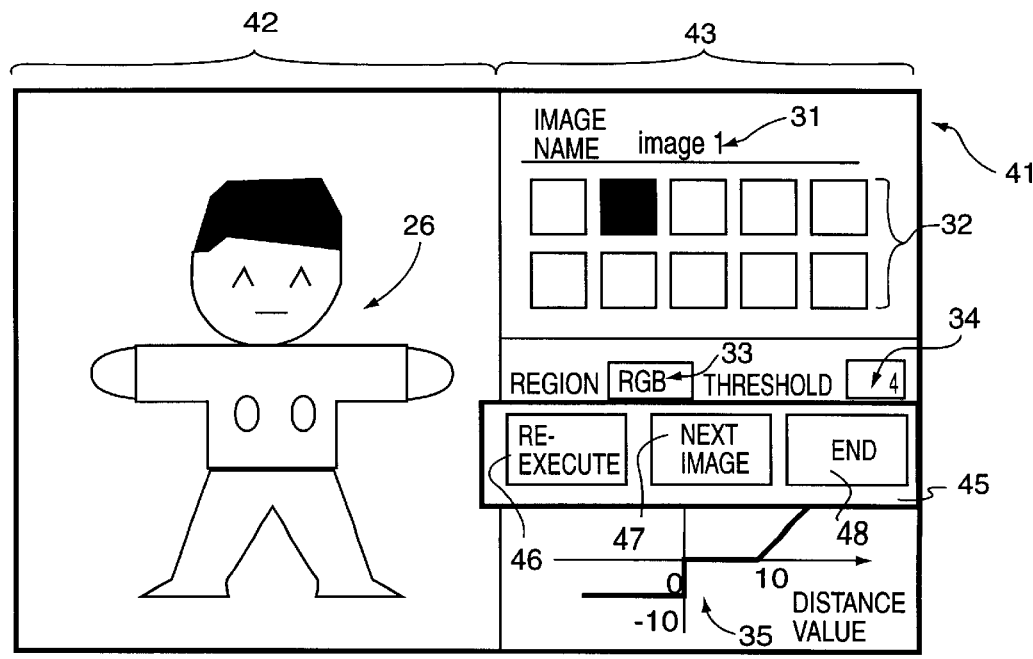
FIG. 3 is a view showing a display image 41 displayed on the image display apparatus 9 immediately before completion of the image processing operation by the image processing apparatus 1.

FIG. 3 is a view showing a display image 41 displayed on the image display apparatus 9 immediately before the image processing operation is accomplished. The display image 41 contains an extracted image 42 which are acquired by the image processing operation, and an information image 43. The extracted image 42 is a two-dimensional image in which an extracted image signal (this will be explained later) is visually displayed, namely is such an image that only the subjective object image 26 is contained by removing the background image 28 from the above-described basic image 22. The information image 43 contains the information image 23 of FIG. 2 and a selection image 45. The selection image 45 is displayed by way of a so-called "window display". In the window display, at least portions of two sorts of images are arranged with being overlapped with each other, and pixels of one image are detected in the image overlapped portion to thereby display only pixels of the other image. As a result, a pseudo-display can be made in such a manner that the other image is located in front of one image. In this selection image 45, button images 46 to 48 (this will be explained later) are involved. "RE-EXECUTION", "NEXT IMAGE", and "END" characters are illustrated on the respective buttons 46 to 48, respectively. The operator may select detailed operations of the image processing operation by selecting any one of these buttons 46 to 48 by way of the below-mentioned methods.

Figure 4:
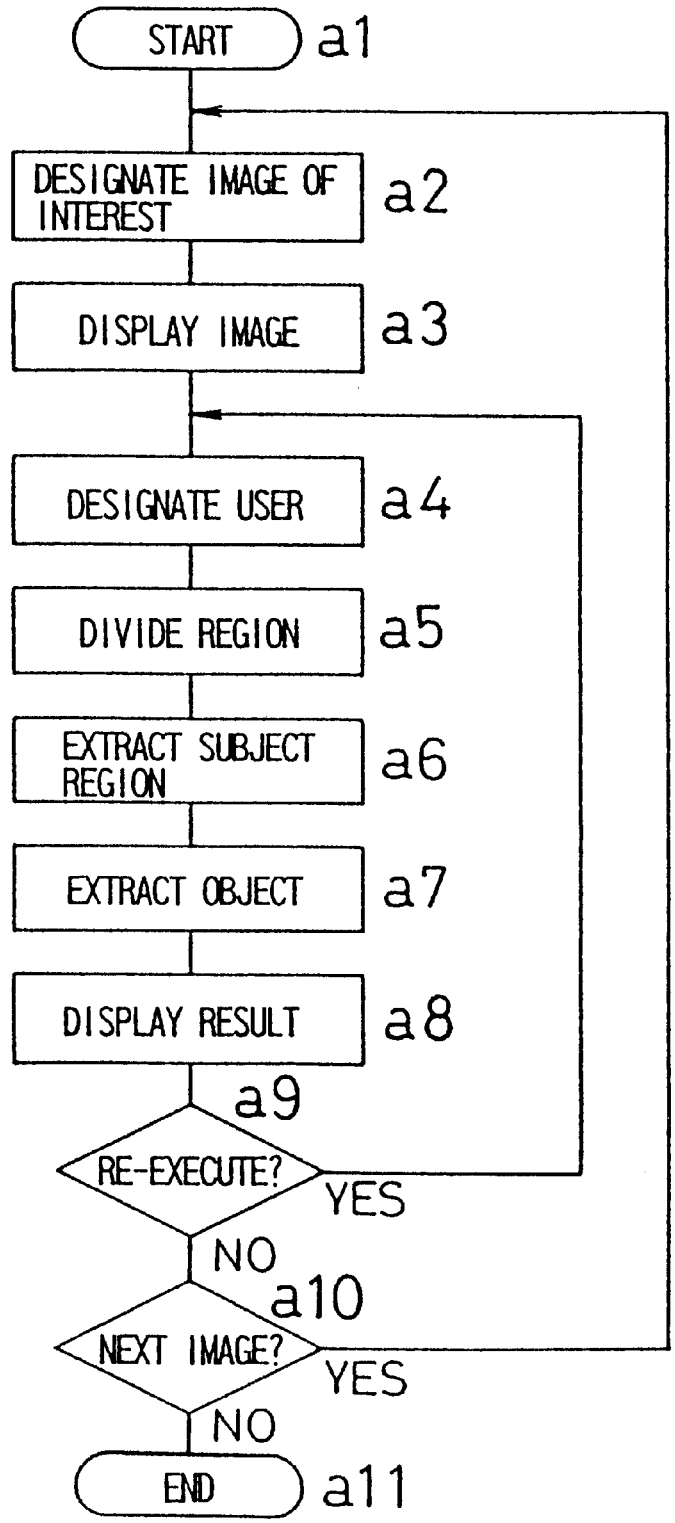
FIG. 4 is a flow chart for explaining the image processing operation executed in the image processing apparatus 1.

FIG. 4 is a flow chart for explaining the image processing operation executed in the above-explained image processing apparatus 1. Referring now to this flow chart, the image process operation will be explained. In this image processing operation, while the contour region 25 designated within the basic image 22 by the operator of the image processing apparatus 1 is used as a reference, the subjective object image 26 is extracted from the initial region 27.

Under such a condition that either one or plural basic image signals have been stored in the image storage circuit 7, the central processing circuit 4 causes the information image to be displayed in the information display region of the image display apparatus 9. The basic image signal within the image storage circuit 7 is entered from the image input apparatus 3, and is conducted via the image input apparatus 3 from an external apparatus at an arbitrary time instant before the process operation of this flow chart is commenced. An information image is resembled to the above-described information image 23 of FIG. 2. In this information image, there is no reduced image in the reduced image group 32, which is displayed in the inverse mode. Moreover, neither the characters of the image name 31, the region divide method 33, and the threshold value 34, nor the polygonal line 38 of the distance/factor graph are illustrated. Also, no indication is made in the image display region. This condition is recognized as an initial condition of this image processing operation. When the image processing apparatus 1 is brought into such an initial condition, the image processing operation is advanced from a step a1 to a step a2.

Alternatively, under the above-described initial condition of the image processing operation, previously set initial setting values may be written into each of the information. For instance, while a reduced image at a preselected position in the reduced image group 32 is displayed in the inverse mode, the image name 31 thereof is contained in the information image 23. At the same time, a basic image corresponding to this reduced image is visually displayed in the image display region. Alternatively, at the same time, characters indicative of the preselected initial setting values of the image processing operation may be written into the region dividing method 33 and the threshold value 34, and furthermore, a polygonal line indicative of an initial setting value of the factor value with respect to the distance value may be written into the distance/factor graph 35. These initial setting values are previously stored into the operation data area of the memory 6, or the memory 5, for example, and then are read out from the memories 5 and 6 by the central processing circuit 4 to be supplied to the image display apparatus 9.

At step a2, the operator designates the basic image 22 to be processed by using the operation input apparatus 10 as designation means. This designating method may be realized by depressing a bottom of a mouse by the operator when the operation input apparatus 10 contains, for instance, the mouse under such a condition that a mouse cursol is overlapped with the reduced image of the basic image to be selected from the reduced image group 32 of the information image. The mouse cursor has a shape of, for example, an arrow. A size of the mouse cursor is sufficiently smaller than the dimension of the display image. This mouse cursor is displayed in the display region of the image display apparatus 9 in such a manner that this mouse cursor is overlapped with the display image. The display position of this mouse cursor is moved within the display region in response to a move distance and a move direction, which correspond to a rotation amount of a ball and also a rotation direction of this ball provided within the mouse. Hereinafter, a series of the above-described operation will be referred to as "the mouse is clicked". The operator designates, for instance, a display position of a desirable reduced image within the display image by executing a series of the above-described operation. The operation input apparatus 10 supplies an output signal to the central processing circuit 4, and this output signal indicates a positional coordinate value of a position within the designated display image. When the output signal is derived, the image processing operation is advanced from step a2 to a step a3.

At step a3, referring first to the positional coordinate value indicated by the output signal supplied from the operation input apparatus 10 and the display image, the central processing circuit 4 judges the designated basic image. Next, the central processing circuit 4 reads the basic image signal of the designated basic image 22 from the image storage circuit 7, and then supplies this basic image signal to the image display apparatus 9. The image display apparatus 9 visually displays in the image display region, the basic image 22 which is the two-dimensional image represented by the supplied basic image signal. At the same time, the character of the image name 31 is added to the information display region so as to be visually displayed therein, and the reduced image of the basic image 22 within the reduced image group 32 is displayed in the inverse mode. Under initial condition, in such a case that the basic image and the characters of the image name for the initial setting operation are displayed in the image display region and the image name, after these basic image and character of the image name are deleted, the above-explained basic image 22 and the character of the image name 31 are displayed. Also, after the inverted display of the reduced image of the basic image for initial setting operation is returned to the original display, the reduced image of the above-described basic image 22 is displayed in the inverse mode. When such a display operation is completed, the image processing operation is advanced from step a3 to a step a4.

At this step a4, the contour region 25, the pixel data sort and the reference difference value of the region dividing operation, and the factor value with respect to the distance value are designated by the operator. When the pixel data sort and the reference difference value are designated, the operator enters characters indicative of the desirable method and value by employing, for instance, a keyboard contained in the operation input apparatus 10 as characteristic selecting means, and also difference value setting means. The operation input apparatus 10 supplies an output signal indicative of the characters thereof to the central processing circuit 4, and also supplies the output signal to the memory 6 so as to store this output signal into the operation data area. The control processing circuit 4 determines the sort of pixel data employed in the region dividing operation in response to this output signal, and also writes the characters in the rectangular regions 36 and 37 by the image display apparatus 9.

Figure 5:
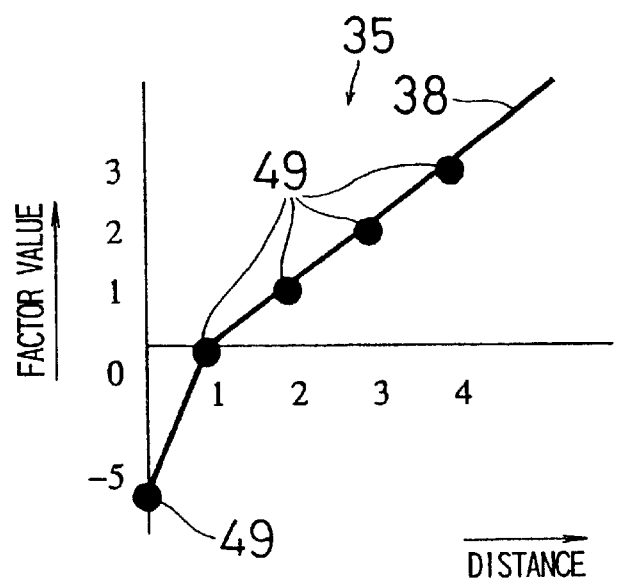
FIG. 5 is a distance factor graph 35 of an information image displayed in an information display region of the image display apparatus 9.

When the factor value with respect to the distance value is designated, the operator rewrites the polygonal line 38 of the distance factor graph 35. As shown in FIG. 5, for instance, a plurality of symbols 49 made of black circles indicative of designation points are displayed while being overlapped with the polygonal line 38. The operator overlaps the mouse cursor on these symbols by employing the mouse of the operation input apparatus 10 as factor changing means, and then moves the mouse while depressing the button of the mouse under this condition. The central processing circuit 4 moves the symbol 49 within the information display region by a travel distance corresponding to a rotation amount of the ball of the mouse, in a move direction corresponding to a rotation direction of the ball of this mouse, so that a straight line for connecting the moved symbol 49 with another symbol 49 located adjacent to this moved symbol 49 is drawn. As a result, the shape of the polygonal line 38 is changed. A series of the above-described mouse operation will be referred to as "to drag by a mouse" hereinafter. The information about the shape of the polygonal line 38 changed by manipulating the mouse in this manner, for instance, a relationship between the distance value and the factor value indicated by the position of the symbol 49 is stored in the operation data area in a table form. A table 1 represents the above-explained relationship between the distance value and the factor value, and indicates a factor conversion table stored in the operation data area.

TABLE 1

| Distance value | ... | 0 | 1 | 2 | 3 | 4 | ... |
|---|---|---|---|---|---|---|---|
| Coefficient value | ... | −5 | 0 | 1 | 2 | 3 | ... |

The contour region 25 may be designated in such a manner that, for example, the operator uses the operation input apparatus 10 as designating means to designate a plurality of contour designation points 50 around the subjective object image 26 within the display image 22 of the image display region. In FIG. 2, the contour designation points 50 are expressed by a mark "X". The designation point 50 is designated by moving the mouse of the operation input apparatus 10 to a position desired by the operator and then by clicking this mouse at this point. The operation input apparatus 10 supplies to the central processing circuit 4 an output signal related to a positional coordinate value of the mouse cursor when the mouse is clicked.

Referring now to the output signals derived from the operation input apparatus 10 and the display image, the central processing circuit 4 judges the positional coordinate values of the contour designation points 50 within the display region 22. The judged positional coordinate values are sequentially stored in the contour coordinate series storage circuit 8, and also are sequentially supplied to the image display apparatus 9. The image display apparatus 9 displays the symbols of the contour designation points 50 while being overlapped on the basic image 22. The contour coordinate series is such a series that the positional coordinate values of all the contour designation points on a certain contour region 25 are arranged in order of input.

When all of the contour designation points 50 have been inputted, the central processing circuit 4 causes the image display apparatus 9 to display line segments while being overlapped on the basic image 22. The line segments are defined by both ends of two sets of the contour designation points 50 entered in such a way that the respective contour designation points 50 are sequentially and continuously inputted. Furthermore, another line segment is displayed on the image display apparatus 9, which is constituted by the firstly inputted contour designation point 50 and the finally inputted contour designation point 50. Pixels of the basic image 22 with which those line segments and the contour designation points are superimposed may be recognized as the pixels of the contour region 25. A contour line obtained when the contour region 25 is macroscopically observed corresponds to such a line that the above-described line segments are sequentially connected at the contour designation points 50, namely a closed line. While recognizing such a contour region 25 as an outermost edge portion, the pixels of the contour region 25 and the pixels inside the region surrounded by the contour region 25 may be recognized as pixels of an initial region 27. During the designation operation of the contour region 25, the operator necessarily designates equal to or more than three sets of these contour designation points 50 to cause the contour line to make a closed line in order that the initial region 27 is designated.

The display image 21 of FIG. 2 is displayed on the image display apparatus 9 by executing such a series of operations. It should also be noted that the above-described designation method for designating the respective parameters and the contour region 25 may be realized by employing methods other than the above-described designation method. When the user designation operation related to a plurality of parameters is accomplished, the image processing operation is advanced from step a4 to a step a5.

Also, when there are previously initial setting values as to the above-explained region dividing method 33, threshold value 34, and distance factor graph 35, the operator inputs only parameters to be changed among the initial setting values by the above-described method during the above-explained user designation operation. At this time, the central processing circuit 4 directly stores the values of the inputted parameter into the operation data area and, with respect to the values of the not inputted parameters, reads the initial setting values stored in the memory 5. Then, the central processing circuit 4 stores the read initial values into the operation data ares. Alternatively, while an initial position is prepared also to the each contour designation point 50 of the contour region 25, the contour region 25 defined by the contour designation points 50 at the initial position may be displayed while being overlapped with the basic image 22 at the same time when the display image is displayed. At this time, operator drags to move the each contour designation point 50 on the contour region 25 at the initial position by using the mouse of the operation input apparatus 10. Also, the contour designation point 50 may be newly inputted, so that the contour region 25 may be formed which surrounds a peripheral portion of a desirable subjective object image 26. Furthermore, the contour region 25 may be defined by sequentially designating the pixels contained in the contour region 25 by, for instance, dragging the mouse.

At step a5, in the image dividing unit 13 of the central processing circuit 4, the basic image signal of the basic image 22 to be processed is subdivided into division image signals indicative of each division region. In this region dividing method, among the pixels for constituting the basic image 22, a region in which pixels which are like in color to each other are continuous is considered as a single division region, and a division image signal contains pixel data of the pixels of the division region. As a result, in the example of FIG. 2, the sky 28a and the grounds 28b among the background image 28 will constitute a single division region, respectively. Also, tree 28c is subdivided into a tip/leaf, and a trunk, which will separately constitute division regions, respectively. Since the subjective object image 26 is a human image, a hair, a face, hands, and cloth are subdivided, which will independently constitute single division regions 26a to 26f respectively. This image dividing method will be described later in detail.

Subsequently, at a step a6, in the position computation unit 14, the weight computation unit 15, and the weight judging unit 16 employed in the central processing circuit 4, a division region containing at least a portion of the subjective object image 26 is extracted as a subjective region from a plurality of division regions within the basic image 22. This subjective region corresponds to a division region contained only inside the initial region 27. This subjective region is judged in such a manner that while using as distance and reference position between each pixel within the contour region 25 and each pixel of each of the division regions, which are obtained by the position computation unit 14, a weighting factor of each of the division regions is computed by the weight computation unit 15, and then the magnitudes of the weights for the respective division regions are judged by the weight judging unit 16. For instance, in FIG. 2, the division regions 26a to 26f of the respective portions of the human image indicated by applying the inclined lines are selected. The region extracting method will be discussed later in detail.

Next, at a step a7, in the extracting unit 27 of the central processing circuit 4, the subjective object image 26 is extracted from the subjective region extracted at step a6 to thereby produce an extracted image signal. This operation is carried out in order to remove such an unnecessary image due to the following consideration. That is, when the basic image 22 is a so-called "natural image", a portion of the background image 28 other than the subjective object image 26 may be contained in the division region selected as the subjective region. The subject extracting method will be explained later in detail.

Next, at a step a8, the central processing circuit 4 deletes the basic image 22 from the image display region of the image display apparatus 9, and causes an extracted image 48 of the extracted image signal produced at step a7 to be displayed in this image display region, instead of this basic image 22. The central processing circuit 4 window-displays the above-described selected image 45 while being overlapped on the information image 23 in the information display region, so that the information image 43 is displayed. As a result, the display image 41 of FIG. 3 is displayed on the image display apparatus 9 by executing the display operation. When the operator of the image processing apparatus 1 visually observes this extracted image 42, this operator can judge as to whether or not only the desirable subjective object image 26 is extracted and thus all of the background images 28 are entirely deleted. Subsequently, the operator clicks any one of the button images 46 to 48 provided in the selected image 45 by the mouse to select the subsequent image process operations defined at steps a9 and a10. When a certain output signal is derived from the operation input apparatus 10, the image processing operation is advanced to a step a9.

At step a9, the central processing circuit 4 judges as to whether or not the re-executing instruction of the image processing operation is issued. The re-execution operation is selected in the case that any image other than the subjective object image 26 is contained in the extracted image 42, and in the case that at least a portion of the subjective object image 26 is not contained. In order to instruct the re-execution operation, the operator clicks the button image 46 and, concretely speaking, the central processing circuit 4 judges that the re-execution operation is instructed when the positional coordinate value indicated by the output signal derived from the operation input apparatus 10 is coincident with the coordinate value within the button image 46 in the display region in the image display apparatus 9. When the re-execution operation is instructed, the central processing circuit 4 causes the original basic image 22 to be displayed in the image display region. Then, the image processing operation is returned from step a9 to step a4. At this step a4, a series of process operations defined from the user designation operation to the result display operation is again performed with respect to the original basic image 22. When no re-execution operation is instructed, the image processing operation is advanced from step a9 to a step a10.

At step a10, the central processing circuit 4 judges as to whether or not the image processing operation is performed with respect to a newly provided next image. The operation for repeating the image processing operation with respect to the next image is selected in such a case that, for instance, only the desirable subjective object image 26 is contained in the extracted image 42, and a reduced image of another basic image to which the image processing operation should be carried out is contained in the reduced image group 32. The method for instructing the repetition operation and the judging method by the central processing circuit 4 are identical to each other except for such a point that the subject button image 46 is replaced by the button image 47, as compared with the method for instructing the re-execution operation and the judging method. When the repetition operation is instructed, the image processing operation by the central processing circuit 4 is returned from step a10 to step a2, and a series of process operations from the basic image designating operation to the result display operation are carried out.

When neither the re-execution operation, nor the repetition operation are instructed, the completion of the image processing operation is instructed. The method for instructing the completion of the image processing operation and the judging method by the central processing circuit 4 are identical to the method for instructing the re-execution operation and the judging method except that the subject button image 46 is replaced by the button image 48. When the completion of the image processing operation is instructed, the image processing operation is advanced from step a10 to a step a11, at which the process operation defined in this flow chart is accomplished.

Figure 6:
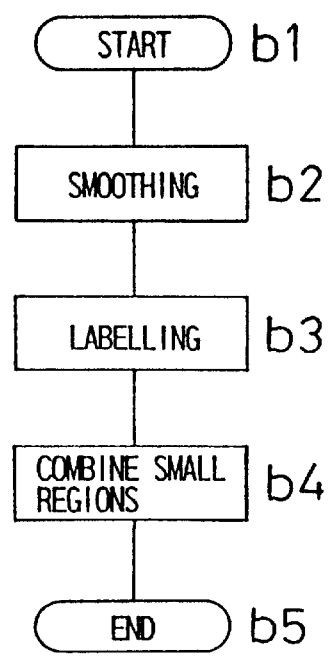
FIG. 6 is a flow chart for indicating, in detail, a region dividing operation defined at step a5 of the flow chart shown in FIG. 4.

FIG. 6 is a flow chart showing in detail the region dividing operation at step a5 of the flow chart shown in FIG. 4. Using now to this flow chart, the above-explained region dividing operation in the image dividing unit 13 of the central processing circuit 4 will be described in detail.

When the image processing operation is advanced from step a4 to step a5 in the flow chart of FIG. 4, the region dividing operation is advanced from a step b1 to a step b2. At this step b2, a smoothing operation of the image signal is carried out. The smoothing operation is carried out in unit of a pixel as to all of the pixels appearing in the basic image. The smoothing operation with respect to a certain pixel of an arbitrary position is executed by replacing data employed in the region dividing operation among the pixel data of this pixel, for instance, a luminance value of the pixel indicated by the luminance data with an average value of luminance of pixels located near this pixel. The adjacent pixels are 8 sets of peripheral pixels located adjacent to this pixel, for instance, while the certain pixel is used as a center. When the basic image is a color image, since luminance data of a plurality of monochromatic lights is contained in the pixel data, the above-explained smoothing operation is performed for every luminance data of the monochromatic lights. Alternatively, the smoothing method may be realized by employing other methods. As a consequence, the adverse influence caused by the noise components can be eliminated from the image processing operation, and this adverse influence is mixed into the basic image signal when being conduced from the image input apparatus 3.

Subsequently, at a step b3, a labelling operation of pixels is carried out. The labelling operation corresponds to such an operation that the same region number is given to pixels whose pixel data are like to each other. This labelling operation is performed in unit of pixel as to all of the pixels existing in the basic image. For instance, in the labelling operation with respect to a certain pixel at an arbitrary position, as to this pixel and a plurality of pixels located near this pixel, a difference value between pixel data used in the region dividing operation, for instance, luminance data is calculated. Subsequently, the respective difference values are compared with a predetermined reference difference value, respectively. A plurality of adjacent pixels correspond to, for example, 8 sets of peripheral pixels located adjacent to a certain pixel. The image dividing unit 13 makes the following judgements. That is, when the above-explained difference value between the certain pixel and another pixel adjoining to this certain pixel is smaller than the reference difference value, it is judged that these two pixels are equal to pixels contained in the same region. When the difference value is larger than or equal to the reference difference value, it is judged that these two pixels are contained in different region. The same region number is respectively given to the pixels contained in the same region. As a consequence, the basic image signal is divided in such a manner that all of the pixels constituting the basic image belong to any one of the plural regions.

Subsequently, at a step b4, a small region unifying operation is carried out. The small region unifying operation implies such an operation that among a plurality of regions subdivided by the labeling operation at step b3, a very small region whose pixel number belonging thereto is small is unified with regions located adjacent to this very small regions. This small region unifying operation is carried out in unit of pixel with respect to, for instance, all of the pixels within the basic image. A unifying method for a certain pixel at an arbitrary position is performed in such a manner that a region number of the certain pixel is substituted by another region number having the highest appearing frequency among the appearing frequencies of the region numbers which are given to a plurality of pixels located around this certain pixel, namely replaced by a region number of a region to which the largest number of plural pixels located around the certain pixel belong.

This very small regions will appear in such a manner that, for example, pixels located near edge portions within a basic image are involved by this very small regions. Concretely speaking, the edge portions are contours of object images and boundaries between regions having different colors from each other in the object images. The reason why the very small region appears at this portion is given as follows. That is, since the region components of the regions located at both sides of the edge portion are different from each other in the pixels near the edge portion, the region components of these regions located at the both sides are mixed with each other, which may be recognized as pixels of region components different from the region components of the regions located at both sides. As a consequence, these regions may be judged as different regions from the regions located at both sides of the edge portion, to which different region numbers are given. This region component implies, for example, a luminance value of the above-described luminance data. The very small regions of these edge portions are unified with the regions located at both sides of the edge portion by the above-described small region unifying operation. As a consequence, the regions whose areas are very small are removed from the division regions, so that a total number of division regions which will be handled in the subsequent processing operation can be reduced. Therefore, the judging operation can be simplified in the weight judging unit 16.

When the small region unifying operation is accomplished, the region dividing operation is advanced from step b4 to a step b5 at which this process operation of the flow chart is completed. As a result, the basic image 22 is subdivided into a plurality of division regions. At this time, the same region number is respectively given to the pixels within each of the division regions. The region number given to each of the pixels corresponds to a positional coordinate value of each pixel within the basic image 22, and is stored as a region labeled image signal into, for instance, the image storage circuit 7. Subsequently, when the central processing circuit 4 judges to which division region the pixel belongs, the region number in this region labeled image signal is read so as to be referred.

The sort of pixel data used in the processing operation during the above-described smoothing operation and labelling operation is designated by the characters of the region dividing method 33 designated in the user designating operation at step a4 of the above-described flow chart shown in FIG. 4. For example, when there are characters of "RGB" in the rectangular region 36, three primary colors of red, green, blue are selected as a combination of the monochromatic lights. Then, the above-explained processing operation is performed as to the color space constructed by the respective red, green, blue luminance data expressed by an 8-bit digital signal. Alternatively, as the sort of pixel data used in these processing operation, if the pixels may be indicated, then not only the luminance data, but also other data, e.g., an HSV value may be used. It should also be noted that as to the reference difference value used in the above-explained labeling operation, the value of the threshold value 34 designated in the user designating operation may be applied. This reference difference value is set to, for example, a value smaller than a difference value of luminance data of pixels of two sorts of display colors indicated in FIG. 7 (this will be discussed later).

Referring now to FIG. 7 to FIG. 12, the subject region extracting operation in the above-described flow chart will be explained in detail.

Figure 7:
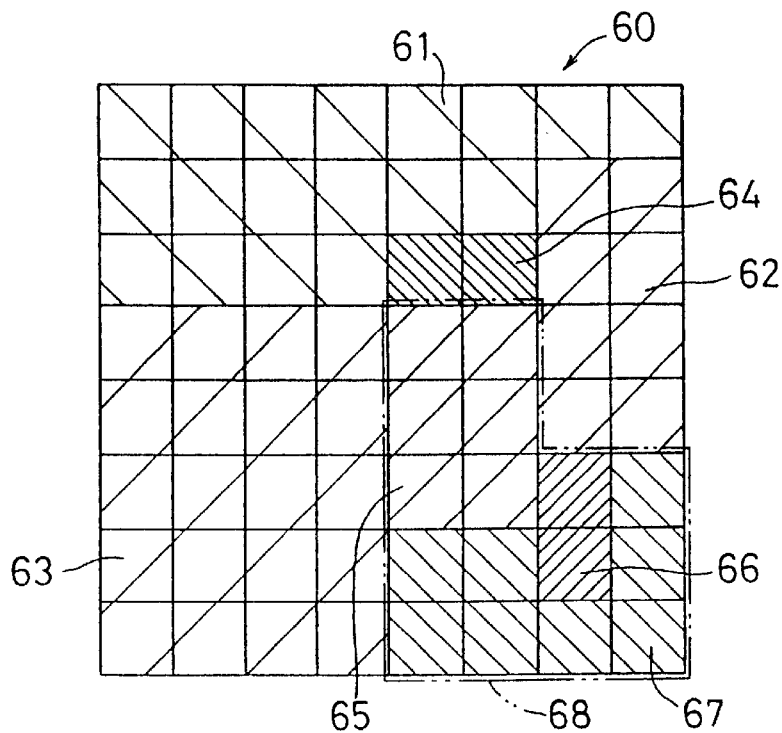
FIG. 7 is an enlarged diagrammatic view of a portion 60 of a basic image 22.

FIG. 7 is an enlarged diagrammatic view showing a portion 60 of the basic image 22. The portion 60 schematically indicates a portion of the basic image 22. One squared rectangular region corresponds to a single pixel. It should be understood that a plurality of pixels are arranged in a straight line form along right/left directions and upper/lower directions on the following drawings, and these pixels will be referred to as a "row" and a "column". In the portion 60 of FIG. 7, 64 pieces of pixels are arranged in a matrix form made of 8 rows and 8 columns. FIG. 7 indicates display colors after being processed by the smoothing process operation at step b2 of FIG. 6 with respect to the respective 64 pixels. Assuming now that a color of each pixel is equal to any one of 8 sorts of colors, color differences are indicated by differences in the directions of the inclined lines and in the intervals in FIG. 7. In the portion 60, the pixels are arranged in such a manner that the pixels having the same colors are located adjacent to each other, which will constitute a region 61 through a region 67, respectively. The pixels constituting the above-explained subject objective image 26 are such pixels within a portion surrounded by a boundary line 68, and correspond to the region 65 to the region 67.

Figure 8:
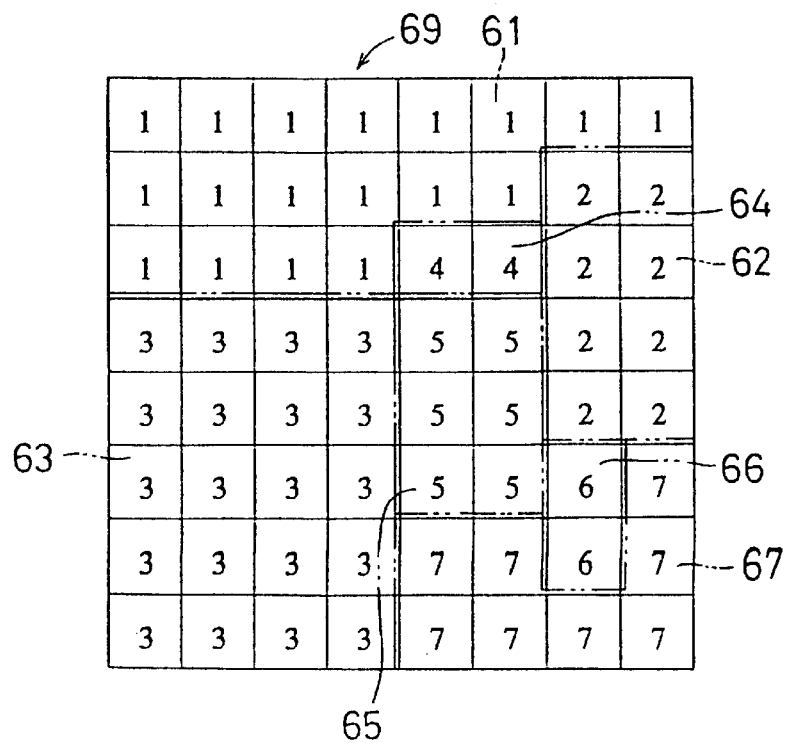
FIG. 8 is an enlarged diagrammatic view showing a portion 69 in a region label image of the basic image 22, which corresponds to the portion 60 in FIG. 7.

FIG. 8 is an enlarged diagrammatic view showing a portion 69 corresponding to the portion 60 of FIG. 7, within the region labeled image of the basic image 22. FIG. 7 and FIG. 8 indicate the same portion of the basic image, and in the drawings rectangular regions located at the same positions correspond to the same pixels. Numerals appearing in the respective rectangular regions represent region numbers of the respective pixels. In the portion 60, the regions 61 through 67 are respectively segmented as a single division region, and region numbers "1" through "7" are respectively given to the respective regions 61 through 67.

Figure 9:
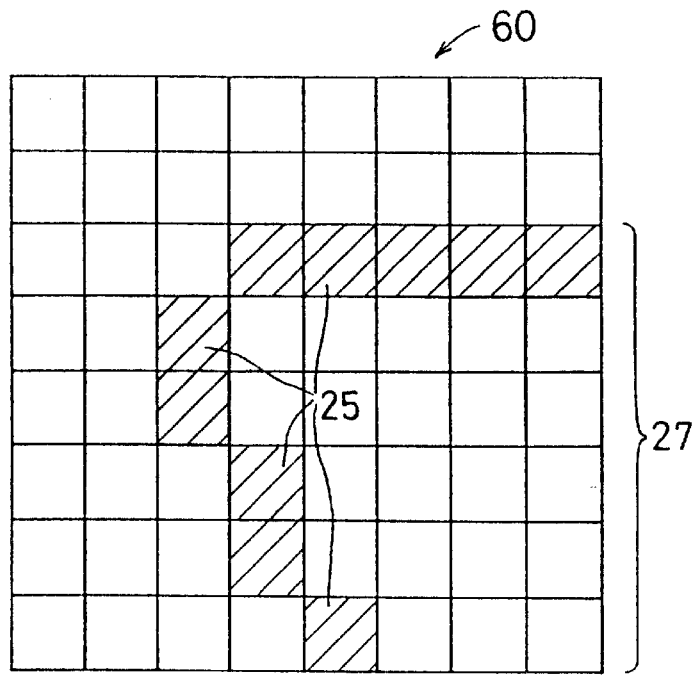
FIG. 9 is an enlarged diagrammatic view showing a position of a contour region 25 within the portion 60 of the basic image 22.

FIG. 9 is an enlarged diagrammatic view showing a position of the contour region 25 within the portion 60 of the basic image 22. FIG. 7 and FIG. 9 indicate the same portion, and in the drawings rectangular regions located at the same positions correspond to the same pixels. A portion of the contour region 25 is involved in the portion 60. In FIG. 9, inclined lines are given to the pixels contained in the contour region 25.

Figure 10:
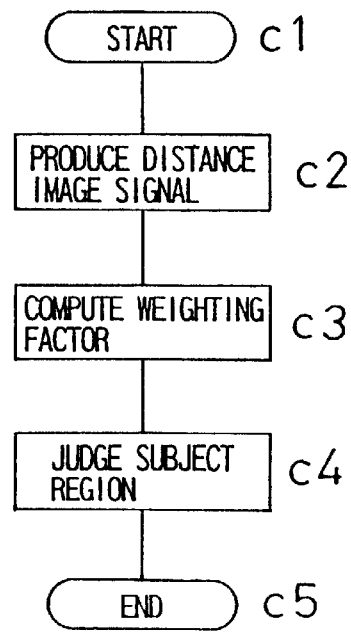
FIG. 10 is a flow chart for explaining, in detail, a subject region extracting operation at step a6 of the flow chart shown in FIG. 4.

FIG. 10 is a flow chart showing, in detail, the subject region extracting operation at step a6 of the flow chart shown in FIG. 4. Referring now to this flow chart of FIG. 10, a detailed description is made of the above-explained subject region extracting operation executed in the position computation unit 14, the weight computation unit 15, and the weight judging unit 16 in the central processing circuit 4.

When the image processing operation is advanced from step a5 to step a6 in the flow chart of FIG. 4, the subject region extracting operation is advanced from a step c1 to a step c2. At this step c2, a distance image signal is produced in the position computation unit 14, and this distance image signal indicates a positional relationship between each of the pixels within the basic image 22 and the pixel of the contour region 25. The positional relationship between the respective pixels and the pixel of the contour region 25 may be indicated by whether or not each of the pixels is located in the initial region 27, and by a relative distance between each of the pixels and the pixel in the contour region 25. The distance image signal corresponds to a set made by that the positional coordinate values of the respective pixels within the basic image 22 are made in correspond to the distance values for quantitatively indicating the positional relationship between each of the pixels and the contour region 25. This distance image signal is stored in the image storage circuit 7.

Concretely speaking, the position computation unit 14 firstly segments the basic image 22 into the initial region 27, and remaining region other than this initial region 27. The initial region 27 is determined, for instance, in correspondence with the advance direction during the designating operation of the contour designation points 50 of the contour region 25 in the above-described user designation operation. For example, when the contour designation points 50 of the contour region 25 is instructed in such a way that each of the contour designation points 50 is rotated in the clockwise direction around the subject objective image 26, a region located on the right side along the designation advance direction of the contour designation points 50 is regarded as the initial region 27, whereas the region located on the left side along the advance direction is regarded as the remaining region.

Subsequently, the distance values of all of the pixels in the remaining region are defined as "0". Next, the distance values of the respective pixels in the initial region 27 are successively defined in the sequence from the pixels within the contour region 25 to the pixels inside the initial region 27. In the defining operation for a distance value of a certain pixel at an arbitrary position within the basic image 22, for instance, a selection is first made of a pixels whose distance value has been defined among 8 sets of peripheral pixels adjacent to this pixel. A check is made of a minimum value of the defined distance value, and then a value obtained by adding "1" to this minimum value is defined as a distance value of the certain pixel. Finally, the defined distance value is stored in the image storage circuit 7 in correspondence with the positional coordinate value of the pixel.

FIG. 11 is a diagrammatic view showing a portion 70 corresponding to the portion 60 of FIG. 7 in the distance image. FIG. 7 and FIG. 11 indicate the same portions of the basic image 22, and in the drawings rectangular regions located at the same positions correspond to the same pixels. The distance image is made by virtually and visually indicating the distance image signal, and numerals appearing in the rectangular regions indicate distance values of pixels thereof. As apparent from FIG. 11, as to the distance values of the respective pixels, the distance values of the pixels of the initial region 27 are larger than those of the remaining region, whereas within the initial region 27, the distance values of the pixels within the contour region 25 are equal to 1, and also the further the pixel is separated from the pixel within the contour region 25, the larger the distance value is increased.

Referring again to FIG. 10, when the distance image signal is produced at step c2, the subject region extracting operation is advanced from step c2 to a step c3. At step c3, the weight computation unit 14 computes weighting factors of the respective division regions 61 to 67 with reference to the above-described factor conversion table and also distance image signal. A weighting factor of a division region corresponds to an accumulated value of factor values given to the respective pixels within this division region. Basically, as to factor value, the factor value of the pixel within the initial region 27 is larger than the factor value of the pixel of the remaining region. Also, with respect to the pixels inside the initial region 27, the larger the distance from the pixel of the contour region 25 is increased, the larger the factor value becomes. Concretely speaking, as represented in the above-described factor conversion table of the table 1 and the distance/factor graph of FIG. 5, the factor value corresponds to the distance value in an one-to-one correspondence. The larger the distance value becomes, the larger the factor value becomes. The factor values corresponding to the distance values of the pixels within the remaining region are negative values, whereas the factor values corresponding to the distance values of the pixels in the initial region is positive values. A method for calculating the weighting factors in the weight computation unit 14 will be explained later in detail.

Figures 12, 13:
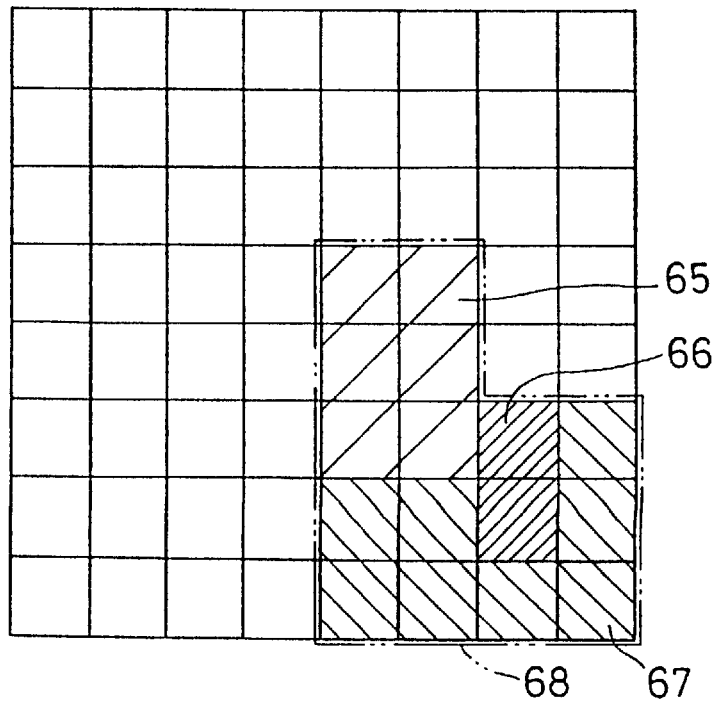
FIG. 12 is an enlarged diagrammatic view showing weighting factors of regions 61 to 67 of the portion 60 of the basic image 22.
FIG. 13 is an enlarged diagrammatic view showing pixels contained in the subject region in the portion 60 of the basic image 22.

FIG. 12 is a diagrammatic view showing the weighting factors obtained in the above-described weight computation operation at the portion 60 of FIG. 7. FIG. 7 and FIG. 12 indicate the same portions of the basic image 22, and in the drawings rectangular regions located at the same positions correspond to the same pixels. As apparent from these drawings, the values of the respective weighting factors of the regions 61 to 67 are −85, −4, −70, 0, 7, 4, and 13, respectively. Among all of these regions 61 to 67, the weighting factors of the regions 64 to 67 where all pixels are contained in the initial region 27 are positive values. The larger the quantity of pixels inside the initial region 27 is increased, the larger the weighting factor becomes. Also, the further the overall region is separated from the contour region 25, the larger the weighting factor becomes.

Also, among the overall regions 61 to 67, the weighting factors of the regions 61 to 63 containing the pixels of the remaining region are negative values. The larger the number of pixels in the remaining region is increased, the smaller the weight factors become. As represented in the above-described table 1, a factor value of a pixel corresponding to a distance value "0" is a negative value. An absolute value of this negative factor value is larger than a factor value of the pixel of the initial region 27 whose relative distance with respect to the contour region 25 becomes equal and which corresponds to a distance value "2". As a result, similar to the regions 62 and 63, in the division region composed of the pixels within the initial region 27 and the pixels of the remaining region, the weighting factor of the entire region becomes smaller than those of the regions 64 to 67 made only of the pixels within the initial region 27 in order that the negative factor value corresponding to the distance value "0" can be offset by the positive factor value corresponding to the distance value equal to or larger than the distance value "1".

Referring back to the flow chart shown in FIG. 10, when the weighting factors of the respective division regions are calculated at step c3, the processing operation is advanced from step c3 to a step c4. At this step c4, the value of the weighting factor obtained at step c3 is compared with a judging value by the weight judging unit 16. Based upon the comparison result, the weight judging unit 16 extracts the subject region from all of the division regions of the basic image 22. As the judging value used in this judging operation, two sorts of judging values are prepared, namely a reference judging value of a predetermined value, and an initial judging value determined by being calculated on the basis of the dimension of the initial region 27. The reference judging value is a fixed value and is, for instance, "1", whereas the initial judging value is a value corresponding to 1% of an area of the initial region 27. The weight judging unit 16 first compares the initial judging value with the reference judging value to thereby select any one of judging values "Th", whose value is large. Subsequently, this selected judging value "Th" is compared with the above-described weighting factor. When the weighting factor is larger than or equal to one judging value "Th", this division region is extracted as the subject region. When the weighting factor is smaller than one judging value "Th", this division region is not extracted. The judging operation will be explained later in detail. When the judging operation is ended, the process operation is advanced to a step c5 at which the process operation of this flow chart shown in FIG. 10 is completed. Since a series of the above-described process operations is performed, either one or plural division region(s) is (are) extracted from the basic image 22 as the subject region.

In such a case that the portions 60 in FIG. 7 to FIG. 9, FIG. 11 and FIG. 12 are employed as an example, since a total number of pixels within the initial region 27 is 21 and an area of a single pixel is 1, the initial judging value is 0.2, and the reference judging value is selected as one judging value "Th". Comparing the reference judging value with the weighting factors of the respective regions 61 to 67, it can be recognized that the weighting factors of the regions 65 to 67 are larger than, or equal to the reference judging value, and that the weighting factors of the regions 61 to 64 are smaller than the reference judging value. As a result, as indicated in FIG. 13, only the regions 65 to 67 are extracted as the subject regions. Also, although the regions 63 and 64 have the pixels within the initial region 27, since the weighting factors become the negative values due to the above-mentioned reason, these regions 63 and 64 can be firmly removed from the subject region. As a consequence, the remaining images other than the subjective object image 26 within the initial region 27 can be removed.

Figure 14:
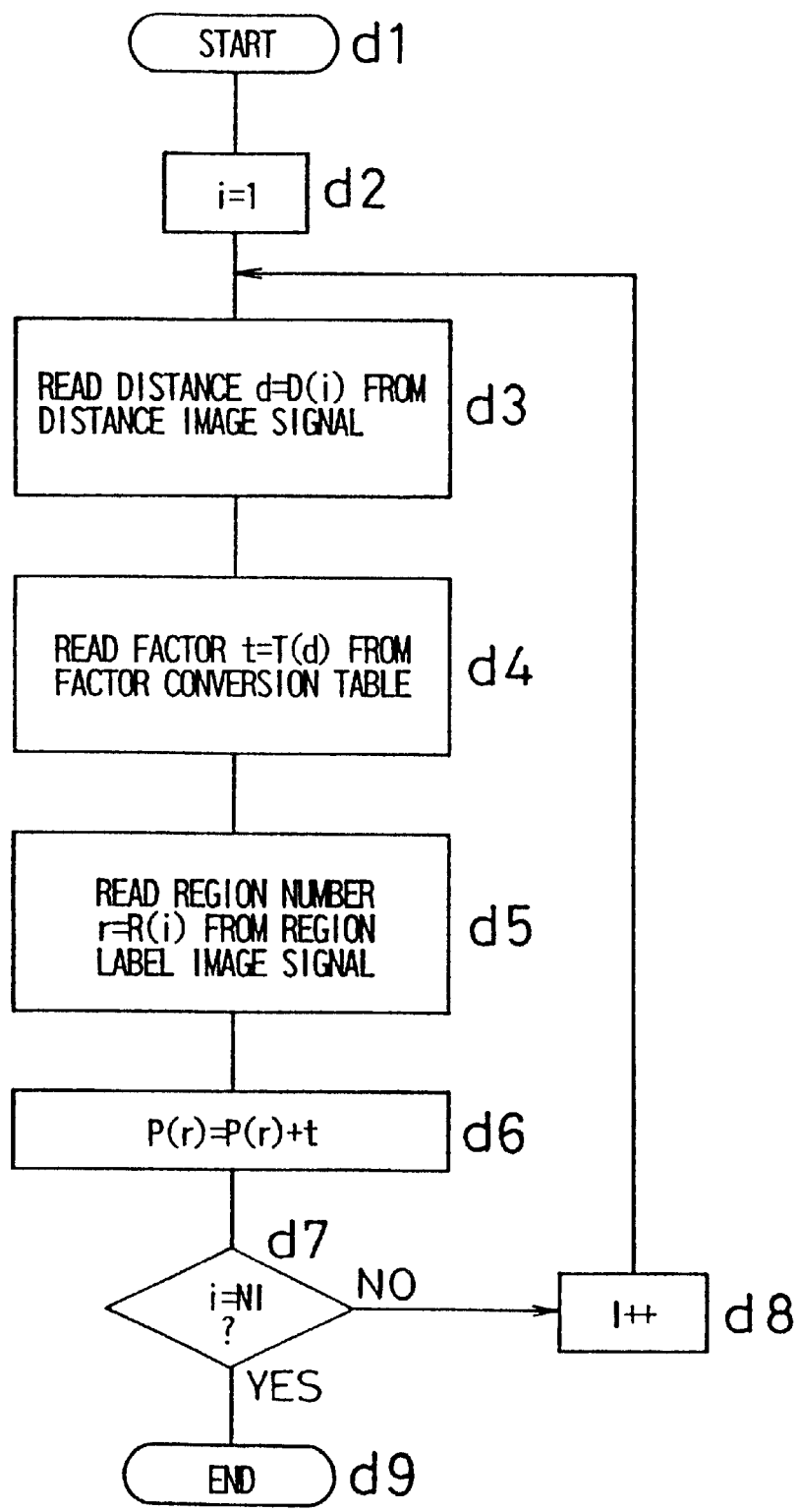
FIG. 14 is a flow chart for explaining, in detail, a weighting factor computing operation of a division region at step c3 of the flow chart in FIG. 10.

FIG. 14 is a flow chart for explaining, in detail, the weighting factor computation operation of the division region executed in the weight computation unit 15 of the central processing circuit 4, at step c3 of the flow chart of FIG. 10. In this flow chart of FIG. 10, when the weight factor computation operation is advanced from step c2 to step c3, the process operation is advanced from a step d1 to a step d2 of the flow chart shown in FIG. 14. At this step d2, 1 is substituted for a number "i" of a pixel as an initial value for the initialization purpose. The number "i" of the pixel designates any one of all of the pixels within the basic image 22, and the numbers of the respective pixels are determined based on, for instance, positional data. Subsequently, at a step d3, a distance value "D(i)" corresponding to the pixel having the number "i" is read out from a position corresponding to the number "i" contained in the distance image signal, and then this read distance value is substituted for a distance variable "d":

$$d = D(i) \tag{1}$$

Subsequently, at a step d4, a factor value T(d) corresponding to the value of the distance variable "d" is read out from the factor conversion table T, and then this read factor value T(d) is substituted for a factor variable "t":

$$t = T(d) \tag{2}$$

Next, at a step d5, a region number R(i) added to the pixel of the number "i" is read out from the region labelled image signal, and then this read region number R(i) is substituted for a region number variable "r":

$$r=R(i) \quad (3).$$

Subsequently, at a step d6, the value of the factor variable "t" is added to a weighting factor P(r) of a division region having the same number as the value of the region number variable "r" so as to be updated:

$$P(r)=P(r)+t \quad (4).$$

Next, at a step d7, a judgment is made as to whether or not the value of the number "i" is coincident with all of the pixel numbers "NI" within the basic image 22. When this value of the number "i" is not coincident with the all pixel number NI, at a step b8, "1" is added to the value of the number "i" for updating. Then, the processing operation is returned to a step b3. As a result, the processing operations at these steps d3 to d7 are repeatedly performed every pixel as to all of the pixels contained in the basic image 22. Conversely, when the value of the number "i" is coincident with the all pixel number "NI", the processing operation is advanced from step d7 to a step d9, at which the processing operation of this flow chart shown in FIG. 14 is accomplished. As a consequence, the weighting factors of the respective division regions can be calculated.

Figure 15:
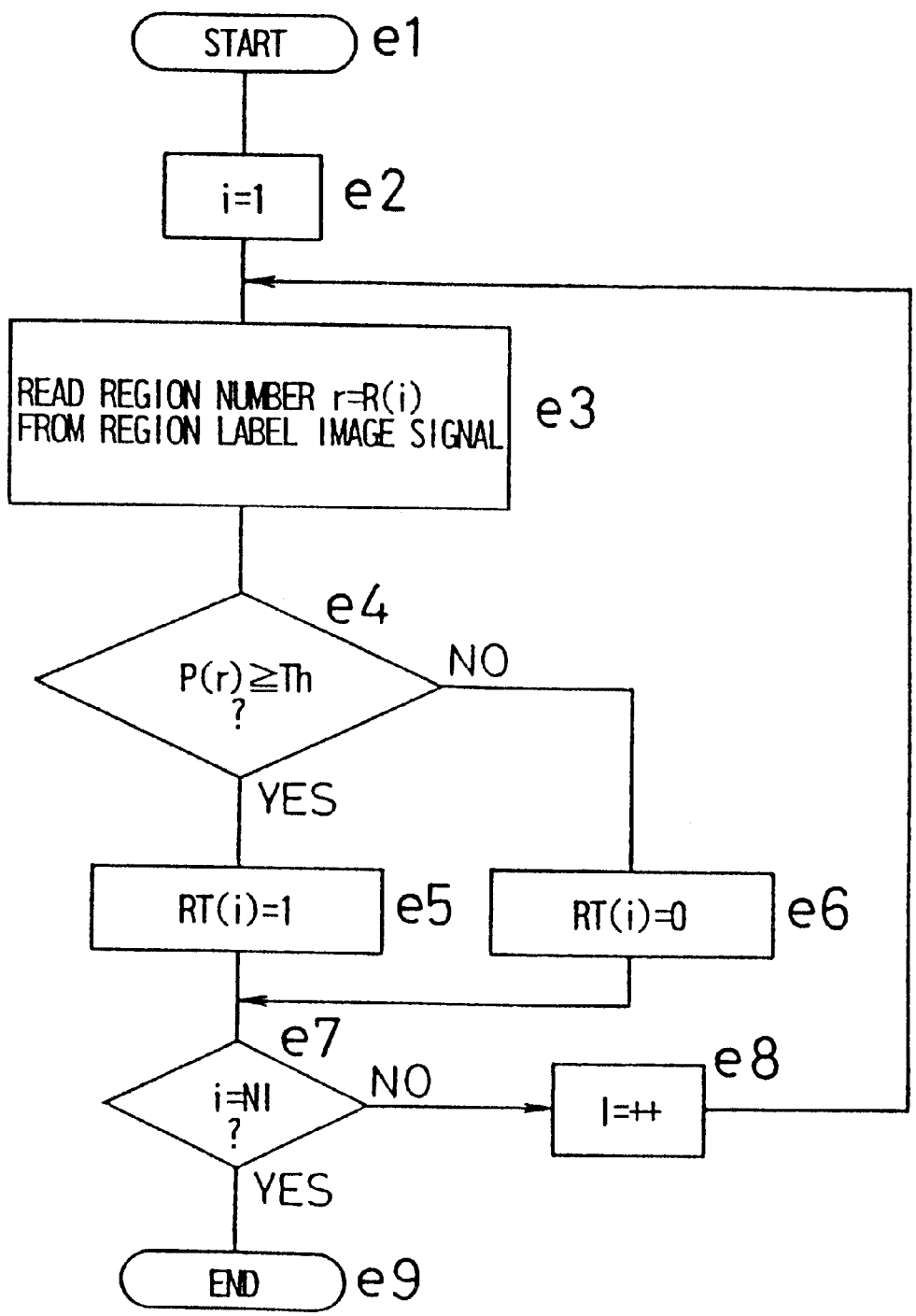
FIG. 15 is a flow chart for explaining, in detail, a weighting factor judging operation for a division region at step c4 of the flow chart in FIG. 10.

FIG. 15 is a flow chart for explaining, in detail, the judging operation for the weighting factor of the division region, executed in the weight judging unit 16 of the central processing circuit 4 at step c4 of the flow chart in FIG. 10. After the processing operation is advanced from step c3 to step c4 in the flow chart of FIG. 10, and any one of the above-described judging values is determined, the judging operation is advanced from a step e1 to a step e2. At step e2, 1 is substituted for the number "i" as an initial value for executing an initialization. It should be understood that the number "i" is identical to that of the pixel shown in FIG. 14. Subsequently, at a step e3, a region number R(i) added to the pixel of the number "i" is read from the distance labeled image signal, and then the read region number R(i) is substituted for a region number variable "r":

$$r=R(i) \quad (5).$$

Next, at a step e4, a weighting factor P(r) of a division region having the same number as the value of the region number variable "r" is read out, and then a judgment is made as to whether or not this read weighting factor is greater than or equal to any one of the above-described judging values "Th":

$$P(r) \geq Th \quad (6).$$

When the weighting factor P(r) is greater than or equal to any one of the judging values "Th", the processing operation is advanced from step e4 to a step e5 at which "1" is substituted for a pixel value RT(i). Conversely, when the weighting factor P(r) is smaller than any one of the judging values "Th", the processing operation is advanced from step e4 to a step e6 at which "0" is substituted for the pixel value RT(i). The pixel value RT(i) is added to, for example, the region labelled image signal, and the added pixel value is stored. When the pixel value RT(i) is "1", this pixel value represents that it is equal to the pixel located within the subject region. When the pixel value RT(i) is "0", this pixel value represents that it is equal to the pixel located outside the subject region. The processing operation is advanced from steps e5 and e6 to a step e7:

$$RT(i)=1 \quad (7)$$

$$RT(i)=0 \quad (8).$$

At step e7, a judgement is made as to whether or not the value of the number "i" is coincident with all of the pixel number "NI" within the basic image 22. When this value of the number "i" is not coincident with the all pixel number NI, at a step e8, "1" is added to the value of the number "i" for updating. Then, the processing operation is returned to a step e3. As a result, the processing operations at these steps e3 to e7 are repeatedly performed every pixel as to all of the pixels contained in the basic image 22. Conversely, when the value of the number "i" is coincident with the all pixel number "NI", the processing operation is advanced from step e7 to a step e9, at which the processing operation of this flow chart shown in FIG. 15 is accomplished. As a consequence, all of the pixels within the basic image 22 can be segmented into the pixels located inside/outside the subject region.

Hereinafter, the object extracting method executed in the extracting unit 17 of the central processing circuit 4 will now be explained in detail. As the object extracting method, for instance, a method called as a "Snakes method" may be used. The Snakes method is disclosed in "Active Contour Models" by M. Kass and Snakes, International J. Computer Vision, on page 321 (1988).

In accordance with the Snakes method, the extracted contour line is dynamically deformed in order that the energy "ΣEsnake" of the defined contour line can be minimized, so that the extracted contour line of the object image to be extracted can be obtained. N pieces of contour points P(O) to p(N−1) are set on the extracted contour line, and an arbitrary contour point P(i) is defined by a positional coordinate value (x(i).y(i)) within the basic image 22. A variable "i" a value larger than or equal to 0 but smaller than or equal to N−1.

Energy "Esnake (i)" of a contour point P(i) may be defined by the below-mentioned formula (9):

$$E\text{snake}(i)=E\text{int}(i)+E\text{image}(i)+E\text{con}(i) \quad (9).$$

Symbol "Eint(i)" indicates force under which the contour line is tried to be contracted while keeping smoothness, and may be defined by, for instance, the following formula:

$$E\text{int}(i)=\alpha \times |P(i)-P(i-1)|2+\beta \times |P(i+1)-2\times P(i)-P(i-1)|2 \quad (10)$$

Symbol "Eimage(i)" denotes force under which the contour line is tried to be adapted to a feature of an image, and may be defined by the below-mentioned formula (11) by using a feature amount I(i) of a pixel within the basic image 22 superimposed the contour point P(i). For instance, while using the above-described pixel value RT(i), when the contour point P(i) is located within the subject region, the feature amount I(i) is "1", whereas when the contour point P(i) is located outside the subject region, the feature amount I(i) is "0". Alternatively, as to this feature amount I(i), any values other than the pixel value RT(i) maybe used, for example, luminance of a pixel of an edge image produced by extracting only the edge of the basic image may be used.

$$E\text{image}(i)=\gamma+I(i) \quad (11).$$

Symbol "Econ(i)" represents force capable of deforming the contour line along a certain direction, and may be defined by an area S(i) of a triangle in which contour points P(i−1), P(i), and P(i+1) constitute the vertex of this triangle in accordance with the following formula:

$$E\text{con}(i) = \Delta \times S(i) \qquad (12).$$

The energy Esnake(i) of the contour point defined by these formulae (9) to (12) is calculated as to all of the contour points P(O) to P(N−1). Then, a summation value of the energy Esnake(O) to the energy Esnake(N−1) at all of the contour points is set as energy "ΣEsnake" of the contour line:

$$\sum Esnake = \sum_{i=0}^{N-1} Esnake(i). \qquad (13)$$

With respect to the above-described formulae (9) to (13) and the descriptions thereof, "energy" and "force" correspond to numeral values in this embodiment mode. Symbols "α", "β", "γ", and "Δ", indicate predetermined constants, respectively.

The extracting unit 17 sequentially moves the contour points of the contour line in the direction along which the energy ΣEsnake of the contour line within the initial region 27 may be predicted to be decreased, so that a new contour line is set. Every time the contour line is newly set, the energy ΣEsnake of the above-described contour line is calculated as to this newly set contour line. When this operation is repeatedly carried out plural times to thereby obtain such a contour line, the energy ΣEsnake of which becomes the minimum value, this contour line is set as an extracted contour line. Also, when the repetition time of a series of the above-described operations becomes larger than or equal to a predetermined definition time, the contour line obtained in the final operation is set as an extracted contour line. The definition time is equal to the number of all pixels interposed between, for instance, the contour region 25 and the outer edge of the subject region. The coordinate values of all of the contour points of this extracted contour line are stored as extracted contour coordinate series signals into the contour coordinate series storing circuit 8. Subsequently, the extracting unit 17 duplicates the pixels data of all of the pixels inside the extracted contour line, sets the pixel data of the remaining pixels as white-colored pixels, and thus produces an extracted image signal made of these pixel data. It is possible to produce the extract image signal by executing a series of such operations.

Alternatively, when the extract contour line is defined, the extracting unit 17 may produce a mask image signal indicative of such a mask image that all of the pixels inside the extract contour line are not colored, but the remaining pixels are white. This mask image is displayed in the image display region of the image display apparatus 9 while being superimposed with the basic image 22. At this time, the no-colored pixels can cause the color of the pixels of the basic image 22 to pass therethrough, whereas the white-colored-pixels can interrupt the color of the pixels of the basic image 22. As a consequence, the same image as the extracted image of the extracted image signal can be displayed in the image display region.

If the same results as those of the above descriptions can be obtained, any methods other than the above-described methods may be employed as the detailed methods employed in the respective operations at steps a1 to a10, b2 to b4, and c2 to c4 in a plurality of the above-described flow charts. Also, the detailed structure of the user interface unit, and the method for displaying various sorts of information to the operator are not limited to the above-described example, but may be modified by employing another structure and another display method.

Alternatively, this image processing apparatus may be realized by a software installed computer, or various sorts of software installed information processing apparatus, in which the software used to execute the above-explained process operation is stored into a storage medium readable by this computer. This software can be stored and the image signal can be inputted into the computer. As this storage medium, a CD-ROM and a floppy disk may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus comprising:

dividing means for dividing a two-dimensional image indicated by an image signal containing a plurality of pixel data indicative of pixels and composed of a plurality of pixels, into a plurality of division regions each composed of either one or plural pixels whose pixel data are similar to each other;

designating means for designating a contour region composed of pixels of an outermost edge portion of an initial region containing an extract region to be extracted from the two-dimensional image;

position computation means for obtaining a positional relationship between each pixel in the contour region designated by the designating means, and each of remaining pixels other than the pixels of the contour region in the two-dimensional image;

weight computation means for obtaining a weighting factor of each division region on the basis of the positional relationships with respect to respective pixels in the division region, obtained by the position computation means;

judging means for comparing the weighting factor of each division region obtained by the weight computation means with a predetermined judging value to thereby judge when the weighting factor is larger than the predetermined judging value that at least a portion of each respective division region is contained in the extract region, and to thereby judge when the weighting factor is smaller than the judging value that the division region is not contained in the extract region; and extracting means for extracting from the image signal, pixel data of pixels of a division region judged by the judging means such that at least a portion thereof is contained in the extract region.

2. The image processing apparatus of claim 1, wherein the positional computation means includes position judging means for judging whether a position of each pixel is located inside or outside the initial region; and distance calculating means for calculating a distance between each pixel of the contour region and each of the remaining pixels, and wherein the weighting factor of each division region is an accumulated value of factor values of the respective pixels constituting the division region, the factor values of the respective pixels correspond to the positions judged by the position judging means and the distances calculated by the distance calculating means, the factor values of the pixels within the initial region are larger than the factor values of the pixels outside the initial region, and further the longer the distances become, the larger the factor values within the initial region become.

3. The image processing apparatus of claim 2, wherein the factor values of the pixels outside the initial region are negative values, whereas the factor values of the pixels inside the initial region are positive values.

4. The image processing apparatus of claim 2, wherein the image processing apparatus further comprises factor changing means for changing the factor values.

5. The image processing apparatus of claim 1, wherein the judging means selects either of a predetermined reference judging value corresponding to an initial region having an area smaller than a predetermined reference area or an initial judging value corresponding to an initial region having an area equal to or larger than the predetermined reference area, on the basis of the area of the initial region inside the contour region designated by the designating means to use as the judging value, and that the initial judging value is varied in response to the area of the initial region.

6. The image processing apparatus of claim 1, wherein the pixel data of each pixel include numeral values related to each of a plurality of display characteristics of the pixel;

wherein the image processing apparatus further comprises characteristic selecting means for selecting one of the plurality of display characteristics and difference value setting means for setting a reference difference value to be compared with a difference value of the numeral values between each pixel and the pixels therearound in the two-dimensional image; and wherein the dividing means calculates a difference value between the numeral value of each pixel and the numeral value of each of a predetermined number of pixels located therearound in the two-dimensional image and divides the two-dimensional image so that pixels having the difference value smaller than the reference difference value are contained in a same region.

7. The image processing apparatus of claim 6, the apparatus further comprising:

display means for displaying an extract image composed of only pixels indicated by the pixel data extracted by the extracting means; and re-executing means for causing at least one of the contour region, any one of the plural sorts of display characteristics and the reference difference value by the designating means, the characteristic selecting means and the difference value setting means to designate again, causing the dividing means to divide the two-dimensional image, causing the position computation means to compute the positional relationship, causing the weight computation means to compute the weighting factor to be judged by the judging means, and causing the extracting means to extract the pixel data.

8. The image processing apparatus of claim 1, the apparatus further comprising:

region unifying means for unifying a plurality of division regions into a single division region when the judging means judges that a plurality of division regions are contained in the extract region, and causing the extracting means to extract pixel data of pixels in this single division region.

9. The image processing apparatus of claim 1, the apparatus further comprising:

storage means for storing a plurality of image signals of two-dimensional images; and image selecting means for selecting a single image signal to be divided by the dividing means, from the plural image signals stored in the storage means and for supplying the selected single image signal to the dividing means.

10. An image processing apparatus comprising:

an operation input apparatus that effects designation of a contour region composed of pixels of an outermost edge portion of an initial region containing an extract region to be extracted from a two-dimensional image; and a central processing unit communicating with the operation input apparatus and controlling an operation of the image processing apparatus, the central processing unit comprising:

an image dividing unit that divides the two-dimensional image indicated by an image signal containing a plurality of pixel data indicative of pixels and composed of a plurality of pixels, into a plurality of division regions each composed of either one or plural pixels whose pixel data are similar to each other, a position calculating unit that obtains a positional relationship between each pixel in the contour region designated by the operation input apparatus, and each of remaining pixels other than the pixels of the contour region in the two-dimensional image, a weight computation unit that obtains a weighting factor of each division region on the basis of the positional relationships with respect to respective pixels in the division region, obtained by the position calculating unit, a weight judging unit that compares the weighting factor of each division region obtained by the weight computation unit with a predetermined judging value to thereby judge when the weighting factor is larger than the predetermined judging value that at least a portion of each respective division region is contained in the extract region, and to thereby judge when the weighting factor is smaller than the judging value that the division region is not contained in the extract region, and an extracting unit that extracts from the image signal, pixel data of pixels of a division region judged by the weight judging unit such that at least a portion thereof is contained in the extract region.

* * * * *